CARLTON H. PAUL,
HOMER J. WOOD,
INVENTORS.

BY John H. J. Wallace

Dec. 26, 1961    C. H. PAUL ETAL    3,014,694
GAS TURBINE AND SEALING MEANS THEREFOR

Filed Oct. 25, 1954    3 Sheets-Sheet 2

CARLTON H. PAUL,
HOMER J. WOOD,
INVENTORS.

BY John H. J. Wallace 3,014,694
GAS TURBINE AND SEALING MEANS
THEREFOR
Carlton Hutton Paul, Redondo Beach, and Homer J. Wood, Sherman Oaks, Calif., assignors to The Garrett Corporation, Los Angeles, Calif., a corporation of California
Filed Oct. 25, 1954, Ser. No. 464,276
6 Claims. (Cl. 253—55)

This invention relates to and finds utility in gas turbines. It has particular application to gas turbine compressors.

The term gas turbine compressor, as used herein, defines a hot-gas operated turbine which drives a compressor arranged to furnish air to a combustor which delivers hot gas to the turbine, and which supplies bleed air for pneumatic power purposes, this last constituting all or a major part of the useful output of the machine.

Small gas turbines for use in aircraft should have a structural arrangement which is rugged, compact and efficient. Thermal insulation of such gas turbine combustion chambers, while highly desirable, has posed some problems, particularly in aircraft installations wherein size and weight are important considerations.

In small, compact gas turbine compressors, it has also been desirable to attain a construction wherein a centrifugal compressor is provided with an efficient peripheral diffuser arranged in closely coupled relationship with the combustion chamber of the associated gas turbine.

Centripetal turbine wheels require means for sealing gases at one side thereof whereby leakage of the motive fluid is maintained at a minimum. Such seals have previously caused a substantial axial pressure differential across the turbine wheel whereby high speed bearings supporting the same were unduly loaded by axial thrust.

In accordance with the present invention a gas turbine compressor may be powerful, compact, efficient and may have a relatively cool external surface surrounding the combustion chamber thereof. In order to provide a compact, powerful and efficient gas turbine compressor, the centrifugal compressor is provided with an efficient peripheral diffuser arranged in closely coupled relationship with the combustion chamber of the gas turbine. Such a construction includes an outer casing which surrounds the combustion chamber and turbine inlet torus and the diffuser disposed at the outlet of the compressor, permitting close coupling of the compressor and turbine, and also providing an efficient, thermally regenerative insulation of the external portions of the machine from combustion chamber heat radiation.

In addition, the present invention embraces means for sealing the turbine against motive fluid leakage and provides for a minimum fluid pressure differential on the turbine wheel axially thereof. Such an arrangement provides for minimum axial loading of the high speed bearings which support the turbine shaft. The present combination of a centrifugal gas turbine wheel and sealing means for motive fluid includes an arrangement wherein fluid pressure in the seal opposer pressure of the motive fluid around the turbine wheel, thereby preventing the motive fluid from leaking through the seal around the turbine shaft. This arrangement permits the seal structure to be close to the shaft and permits a partial balance of the pressures on opposite sides of the wheel to minimize the pressure differential thereacross.

It is an object of the present invention to provide a small gas turbine compressor which is powerful, efficient and compact.

Another object of the invention is to provide a gas turbine compressor which is particularly suitable for installation in aircraft.

Another object of the invention is to provide a gas turbine compressor having a novel arrangement for insulating external portions thereof from combustion heat radiation therefrom.

A further object of the invention is to provide a gas turbine construction wherein a centrifugal compressor is provided with an efficient peripheral diffuser arranged in a novel closely coupled relationship with the combustion chamber of the gas turbine.

A still further object of the invention is to provide novel means for sealing gases at one side of a gas turbine wheel whereby leakage of motive fluid therefrom is maintained at a minimum.

An additional object of the invention is to provide a gas turbine wheel having a seal around its shaft permitting a minimum pressure differential across the wheel whereby axial loading of the high speed bearings supporting the wheel is maintained at a minimum.

Further objects and advantages of the invention will be apparent from the following specification, appended claims and accompanying drawings in which;

Figure 1:
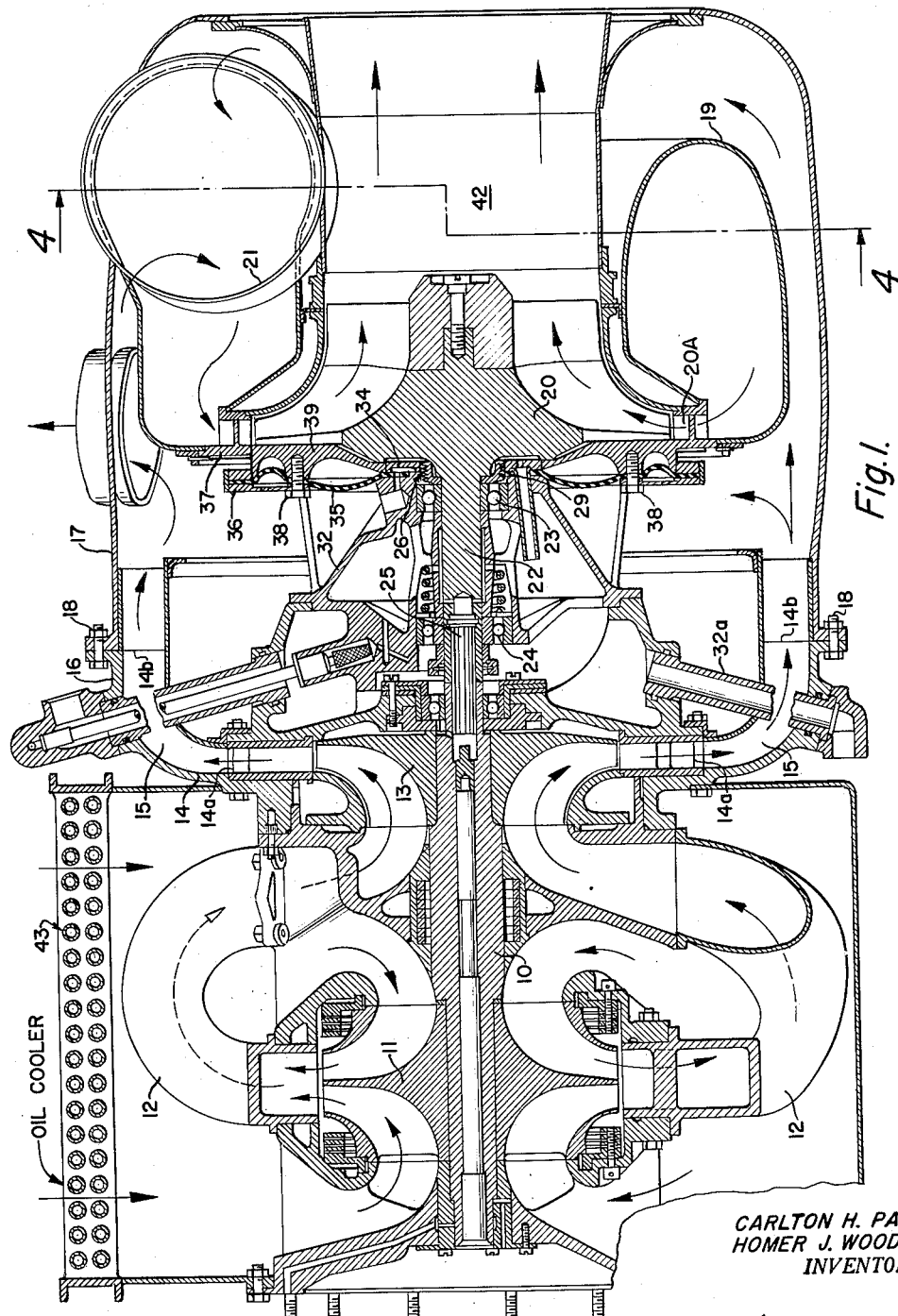
FIG. 1 is a longitudinal axial sectional view of a gas turbine compressor according to the present invention.

The gas turbine compressor as shown in FIG. 1 of the drawings is provided with a two-stage compressor which is mounted on a shaft 10. The first stage of the compressor includes a double-sided impeller 11 which delivers compressed air to ducts 12 communicating with the inlet of an impeller 13 which forms the second stage of the compressor. The impeller 13 is a centrifugal impeller, the periphery of which is surrounded by a diffuser 14 having an annular passage 15 extending from a radial direction to an axial direction. Positioned in the diffuser are vanes 14a disposed normally to the compressor axis. Spaced from the vanes 14a and at right angles thereto are vanes 14b which are disposed at the outlet of the diffuser 14. The vanes 14a are primarily diffuser elements while the vanes 14b are combined diffuser and flow straightening elements. The diffuser vanes are surrounded by a casing structure composed of casing sections 16 and 17. Straightening of flow in the plenum casing 17 provides for more efficient entry of air into the combustor 21. The casing section 16 is arranged in conforming relation to the curvature of the passage 15 and forms an annular structure which completely surrounds the impeller 13. The generally cylindrical casing section 17 is fixed to the casing section 16 by means of flange bolts 18. The casing 17 forms a duct or plenum adapted to receive compressed air which issues from the diffuser as indicated by the arrows in FIG. 1.

The casing section 17 surrounds the outlet portion of the vanes 14b and also surrounds a combustion and gas entry chamber 19 which communicates with the peripheral inlet of a centripetal turbine wheel 20. The entry chamber 19 is of annular shape and surrounds the centripetal wheel 20 and communicates with a combustor 21 which receives compressed air from the interior of the casing 17. Air which is delivered by the compressor impeller 13 flows through the casing 17 and combustor 21 to the interior of the entry chamber 19, then through conventional nozzles 20A to the periphery of the turbine wheel 20. The turbine wheel 20 is provided with a shaft portion 22 which is supported on bearings 23 and 24. The shaft portion 22 is coupled to the compressor shaft 10 by means of a spline member 25. Surrounding the turbine shaft 22 is a two-part labyrinth type seal generally indicated at 26.

Figure 2:
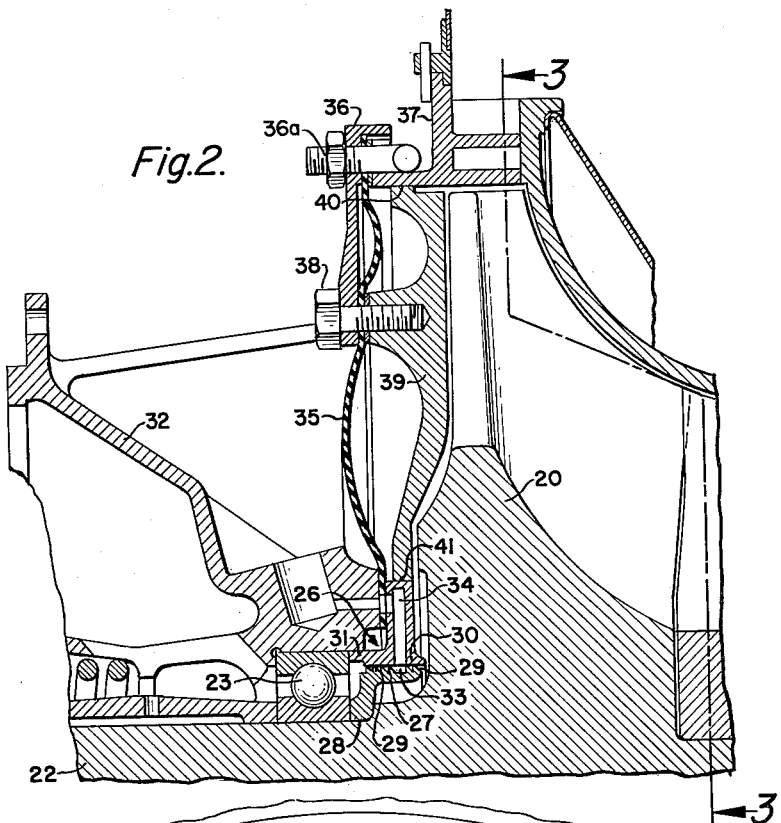
FIG. 2 is an enlarged fragmentary sectional view taken on the same plane as that shown in FIG. 1 and illustrating in detail features of the turbine structure thereof.

The structure of seal 26 is shown in detail in FIG. 2. Carried by the shaft 22 is a labyrinth seal member 27. The seal member 27 is an annular structure having a bore 28 fitted on the shaft 10 in fluid tight relationship therewith. The seal member is provided with an exterior portion having labyrinth grooves 29 which run in close proximity to a bore portion 30 of a stationary bushing 31 which forms the second part of the seal assembly and is fixed to a frame element 32 of the gas turbine compressor, the interior of which frame element 32, through tube 32a, is in communication with atmospheric pressure. The seal member 27 is also provided with a broad external groove 33 which communicates with a duct 34 arranged to have fluid pressure applied thereto from the interior of the casing 17; thus compressor output air may flow through the duct 34 and into the external groove 33 of the labyrinth seal member 27. It will be seen that labyrinth grooves 29 are disposed on opposite sides of the groove 33 whereby fluid pressure therein is applied across the labyrinth grooves 29 and may thereby oppose combustion gas pressure around the turbine wheel 20. In the arrangement shown in FIG. 1, compressor output pressure in the casing 17 exceeds the pressure of combustion gas around the turbine wheel 20 and therefore fluid pressure in the groove 33 of the seal member 27 will effectively oppose combustion gas pressure tending to permit gas to leak through or pass the seal 27 axially of the shaft 22 into the relatively low pressure interior of frame element 32. It will be understood that flow of air from the compressor through the casing 17 must pass the combustor 21 before reaching the turbine wheel 20. Thus the inevitable flow restriction in the combustor causes the combustion gas to be at a lower pressure than that of the compressor output air communicating with the duct 34 and the groove 33 in the labyrinth seal member 27.

Coupled in fluid tight relationship with the bushing 31 and the frame element 32 is a diaphragm 35. This diaphragm 35 extends radially from the seal structure to a frame element 36 near the periphery of the turbine wheel 20. The frame element 36 is clamped by suitable fasteners 36A to the periphery of the diaphragm 35 adjacent a nozzle box structure 37 which communicates with the entry chamber 19. Also fixed to the frame element 36 by means of bolts 38 is a back shroud member 39 which is arranged in close proximity to the blades and back portions of the turbine wheel 20. The diaphragm 35 prevents leakage of fluid at the peripheral portion 40 of the shroud 39 and also prevents leakage through its central opening 41 and around the bushing 31 disposed therein.

Figure 3:
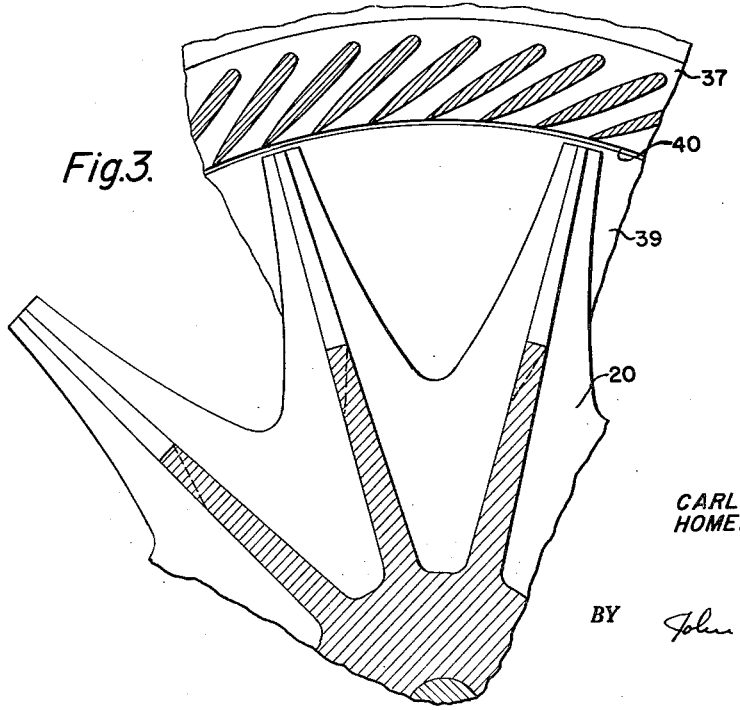
FIG. 3 is a fragmentary sectional view taken from the line 3—3 of FIG. 2.
Figure 4:
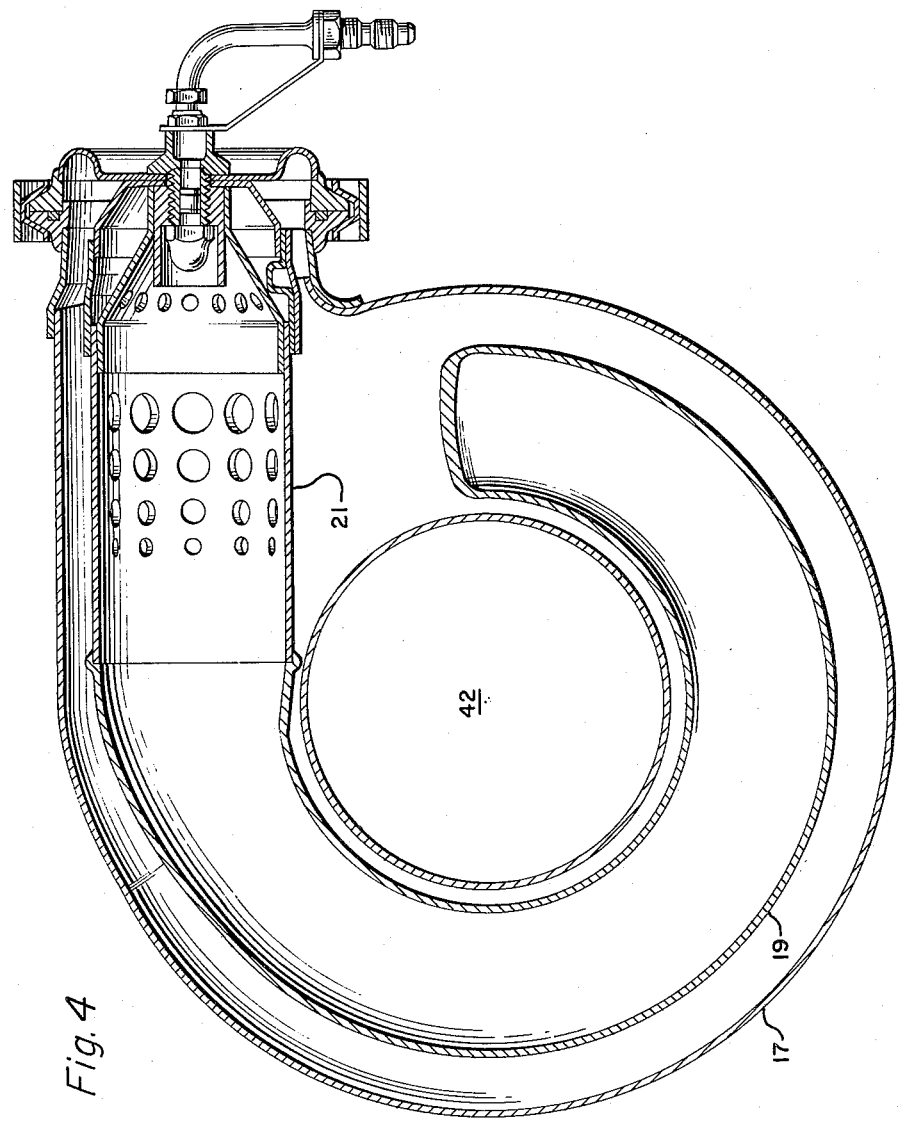
FIG. 4 is a vertical transverse sectional view taken through the combustor and gas inlet chamber of the gas turbine compressor shown in FIGURE 1 on the plane indicated by the line 4—4 of such figure.

It will be understood that the labyrinth seal member 27 cooperating with sealing diaphragm 35 provides a seal structure which prevents leakage of combustion gas from the area of the turbine wheel 20 into the interior of the casing 17 and around the shaft 22. This seal structure provides a novel cooperative combination with the turbine wheel 20. The turbine wheel 20 is a generally star-shaped wheel having a central hub structure provided with radially disposed cantilever blade portions, as illustrated particularly in FIG. 3. Since the actual diameter of the seal member 27 is relatively small in proportion to the overall diameter of the turbine wheel 20, it does not expose a large area at the back of the wheel to a pressure substantially different from that at the front side of the wheel through which combustion gas flows. With reference to FIG. 2 it will be seen that both front and back portions of the wheel hub structure are subject to the combustion gas pressure and, therefore, the axial pressure differential on the wheel is at a minimum, thus maintaining axial loading of bearings 23 and 24 at a minimum.

An oil cooler 43 is disposed in the air inlet to the compressor impeller 11. Air flowing through the oil cooler 43 cools oil which is used for lubricating and cooling various bearings and moving elements of the gas turbine compressor.

Operation of the gas turbine compressor as shown in FIG. 1 is substantially as follows:

When the shafts 10 and 22 are rotating in coupled relation to each other as hereinbefore described, the first stage 11 of the compressor delivers relatively low pressure air to the inlet of the second compressor stage 13 whereupon the pressure of the air is increased and delivered through the diffuser 14 to the interior of the casing 17. Since the diffuser 14 extends around the entire periphery of the centrifugal compressor 13, extending from a radial direction to an axial direction, and exhausting directly into the casing 17, a very efficient arrangement is obtained, particularly where it is desirable to arrange a centrifugal compressor in a compactly coupled relationship with the combustion chambers of a gas turbine. As compressed air is delivered from the diffuser into the casing 17, it flows straight after passing the vanes 14b and then passes around and into the entry chamber 19 which is operating at an elevated temperature. Regenerative heat exchange with the straightened air entering the combustor 21 is accomplished, and at the same time, the exterior of the casing 17 is maintained at a relatively low temperature. The heated air entering the combustor 21 provides for thermal efficiency in the operation of the gas turbine thereby rendering it more economical to operate. As combustion gas passes from the chamber 19 through the turbine wheel 20, it exhausts outwardly through a conduit 42.

Air pressure in the casing 17 is applied through the duct 34 to the groove 33 in the seal member 27. As hereinbefore described, compressor output pressure exceeds combustion gas pressure around the wheel 20, therefore, air pressure existing in the groove 33 opposes leakage of combustion gas through the labyrinth portions 29 of the seal member 27 thereby preventing leakage of combustion gas along the shaft 22 of the turbine wheel 20. At the same time, combustion gas is prevented from leaking away from the area of the wheel 20 by the sealed diaphragm 35 as hereinbefore described. The diaphragm 35 permits the shroud member 39 to be installed with liberal tolerances at its periphery 40 and central opening 41 whereby thermal expansion does not cause displacement or warpage of the adjacent structures. Thus the diaphragm 35 permits reasonable tolerances to be employed in the assembly of the frame elements with the shroud 39, and at the same time prevents leakage therethrough. The diaphragm 35 forms a continuation of the seal structure surrounding the labyrinth seal member 27 which in turn is fitted in fluid tight relationship with the shaft 22. As hereinbefore described, a pressure balance of the combustion gas on the hub of the wheel 20 permits the wheel 20 to be operated in such a manner that minimum axial loading of the bearings 23 and 24 may be attained. In the operation and servicing of a gas turbine compressor as shown in FIG. 1, the external skin surface of the casing 17 is cool relative to the surfaces of the entry chamber 19, which provides an important safety feature, particularly when the gas turbine compressor is installed in close quarters abroad an aircraft, for example.

The invention has been shown and exemplified by its use in a gas turbine compressor. It will be apparent at once to those skilled in the art that it is applicable to gas turbines in which the useful output may be principally or entirely jet thrust or shaft power, or any combination thereof.

We claim:

1. In a gas turbine: a turbine wheel and shaft supported for rotary movement; means supporting a nozzle structure adjacent the periphery of said wheel, gas flow through said nozzle structure effecting the rotation of said wheel and shaft; an annular shroud means at one side of said wheel, said shroud means extending radially inwardly from said nozzle supporting means to a region adjacent said turbine wheel shaft; seal means having a first part supported by said shaft and a second part positioned adjacent the inner portion of said shroud means; and a second seal means of annular configuration secured at its periphery in gas-tight relation to said nozzle supporting means, said second seal means extending completely across said shroud means and being secured at its inner edge portion to the second part of said first-mentioned seal means.

2. In a gas turbine: a turbine wheel and shaft supported for rotary movement; means supporting a nozzle structure adjacent the periphery of said wheel, gas flow through said nozzle structure effecting the rotation of said wheel and shaft; an annular shroud means at one side of said wheel, said shroud means extending radially inwardly from said nozzle supporting means to a region adjacent said turbine wheel shaft; seal means having a first part supported by said shaft and a second part positioned adjacent the inner portion of said shroud means; and a diaphragm seal of annular configuration secured at its periphery in gas-tight relation to said nozzle supporting means, said diaphragm seal extending completely across said shroud means and being secured at its inner edge portion to the second part of said first-mentioned seal means.

3. In a gas turbine: a radial type turbine wheel and shaft supported for rotary movement; means supporting gas conducting elements at the periphery of said wheel; shroud means at one side of said wheel, said shroud means extending from said supporting means to a region adjacent said turbine wheel shaft; a shaft seal at the inner portion of said shroud means; and an annular diaphragm seal secured at the periphery thereof in gas-tight relation to said gas conducting element supporting means and at the inner edge portion thereof to said shaft seal, said annular diaphragm seal extending completely across said shroud means to trap fluid seeping past the edges thereof.

4. In a gas turbine: a frame element and at least one antifriction bearing contained therein; a radial-type turbine wheel and shaft means, said shaft means being journaled for rotary movement in said bearing; a nozzle structure adjacent the periphery of said turbine wheel, gas flow through said nozzle structure effecting the rotation of said turbine wheel and said shaft; shroud means at one side of said turbine wheel, said shroud means extending from said nozzle structure to a region adjacent said shaft; a shaft seal between said bearing and turbine wheel, said shaft seal being provided with a plurality of labyrinth grooves and supported between said shaft and the adjacent portion of said shroud; passage means for establishing communication between a source of fluid under pressure other than said gas flow and said bearing via said shaft seal; and an annular diaphragm seal secured at the periphery in gas-tight relation to said nozzle structure and at the inner edge portion to said shaft seal, said diaphragm seal extending completely across said shroud means to trap gas seeping past the edges thereof.

5. In a gas turbine: a frame element and at least one antifriction bearing contained therein exposed to relatively low pressure; a turbine wheel and shaft means, said shaft means being journaled for rotary movement in said bearing; a nozzle structure adjacent the periphery of said turbine wheel, gas flow through said nozzle structure effecting the rotation of said turbine wheel and said shaft, said gas flow being at relatively intermediate pressure around said turbine wheel; shroud means at one side of said turbine wheel, said shroud means extending radially inward from said nozzle structure to a region adjacent said shaft; a shaft seal at the inner portion of said shroud means, said shaft seal having a plurality of labyrinth sections, said seal surrounding said shaft between said bearing and said turbine wheel; passage means leading from a source of fluid under relatively high pressure, other than said gas flow, to a point between the labyrinth sections of said seal, fluid flow through said passage means being directed by said seal to flow in part toward said bearing and in part toward said turbine wheel; and an annular diaphragm seal secured at the periphery thereof in gas-tight relation to sail nozzle structure and at the inner edge portion to said shaft seal, said diaphragm seal extending completely across said shroud means to prevent fluid seepage past the edges thereof.

6. In a gas turbine: frame means forming a wall between a region receiving compressed air and another region communicating with the ambient atmosphere; an antifriction bearing supported by said frame means; a centripetal type turbine wheel and shaft means, said shaft means being journalled for rotary movement in said bearing; a nozzle structure adjacent the periphery of said turbine wheel to direct gases thereinto to effect the rotation of said turbine wheel and shaft; annular shroud means at one side of said turbine wheel, said shroud means extending radially inwardly from said nozzle structure to a region adjacent said shaft; a shaft seal at the inner portion of said shroud means, said shaft seal having a plurality of labyrinth sections and surrounding said shaft between said bearing and turbine wheel; passage means in said frame means leading from the region receiving compressed air to a point between the labyrinth sections of said shaft seal, part of the compressed air flowing through said passage means being directed by said seal through said bearing to the region communicating with the ambient atmosphere; and an annular diaphragm seal secured at the periphery thereof in gas-tight relation to said nozzle structure and at the inner edge portion to said wall and shaft seal, said diaphragm seal extending completely across said shroud means to trap gas seeping past the edges thereof.

References Cited in the file of this patent

UNITED STATES PATENTS

| | | |
|---|---|---|
| 1,352,743 | Hall | Sept. 14, 1920 |
| 2,121,754 | Cornell | June 21, 1938 |
| 2,244,467 | Lysholm | June 3, 1941 |
| 2,405,048 | Nickerson | July 30, 1946 |
| 2,414,551 | Pavlecka et al. | Jan. 21, 1947 |
| 2,424,010 | Young | July 15, 1947 |
| 2,448,717 | Jeffcock | Sept. 7, 1948 |
| 2,463,898 | Moore | Mar. 8, 1949 |
| 2,474,258 | Kroon | June 28, 1949 |
| 2,477,683 | Birmann | Aug. 2, 1949 |
| 2,540,902 | Moore | Feb. 6, 1951 |
| 2,613,028 | Davis | Oct. 7, 1952 |
| 2,614,797 | Kidney | Oct. 21, 1952 |
| 2,622,843 | Williams | Dec. 23, 1952 |
| 2,625,794 | Williams et al. | Jan. 20, 1953 |
| 2,646,210 | Kohlmann | July 21, 1953 |
| 2,681,760 | Lundquist | June 22, 1954 |
| 2,698,584 | Stelzer | Jan. 4, 1955 |
| 2,709,567 | Wood | May 31, 1955 |
| 2,775,400 | Cox | Dec. 25, 1956 |
| 2,792,197 | Wood | May 14, 1957 |

FOREIGN PATENTS

| | | |
|---|---|---|
| 15,487 | Great Britain | July 2, 1912 |
| 136,484 | Australia | Feb. 24, 1950 |
| 491,080 | Canada | Mar. 10, 1953 |
| 636,290 | Great Britain | Apr. 26, 1950 |
| 988,631 | France | May 9, 1951 |

UNITED STATES PATENT OFFICE
CERTIFICATE OF CORRECTION

Patent No. 3,014,694                          December 26, 1961

Carlton Hutton Paul et al.

It is hereby certified that error appears in the above numbered patent requiring correction and that the said Letters Patent should read as corrected below.

Column 1, line 60, for "opposer" read -- opposes --; column 4, line 66, for "abroad" read -- aboard --; column 6, line 13, for "sail" read -- said --.

Signed and sealed this 30th day of October 1962.

(SEAL)
Attest:

ERNEST W. SWIDER                                    DAVID L. LADD
Attesting Officer                                         Commissioner of Paten